J. J. DUBOIS.
Wagon Running-Gear.

No. 223,897. Patented Jan. 27, 1880.

WITNESSES:
C. Neveux
C. Sedgwick

INVENTOR:
J. J. DuBois
BY Munn &C
ATTORNEYS.

UNITED STATES PATENT OFFICE.

JAMES J. DUBOIS, OF SPRINGTOWN, NEW YORK.

WAGON RUNNING-GEAR.

SPECIFICATION forming part of Letters Patent No. 223,897, dated January 27, 1880.

Application filed December 15, 1879.

*To all whom it may concern:*

Be it known that I, JAMES J. DUBOIS, of Springtown, in the county of Ulster and State of New York, have invented a new Improvement in Wagon-Reaches, of which the following is a specification.

Figure 1:
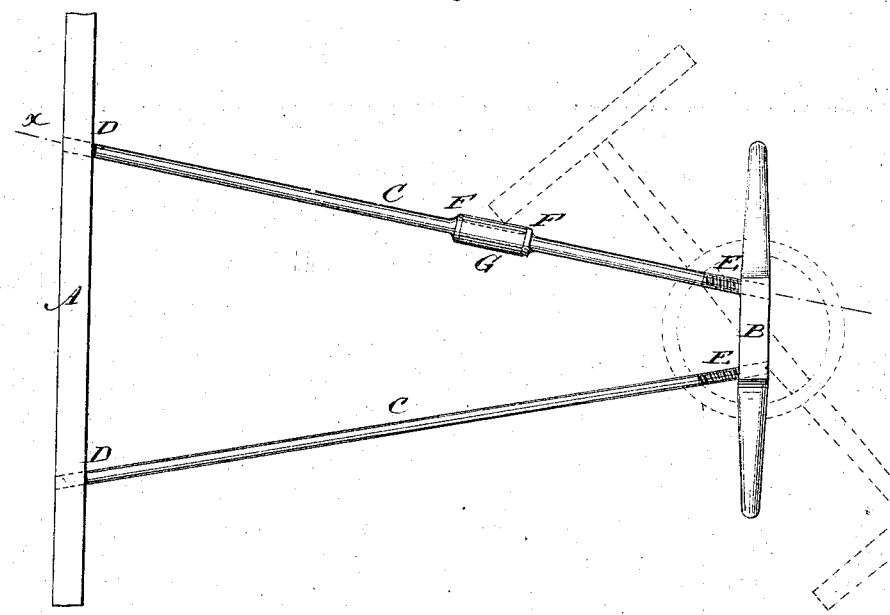
Figure 2:
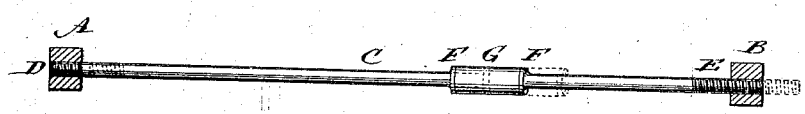

Figure 1 is a plan view of my improvement. Fig. 2 is a sectional side elevation taken through the line $x\ x$, Fig. 1.
Similar letters of reference indicate corresponding parts.

The object of this invention is to furnish wagon-reaches so constructed that they may be screwed into the rear axle and the head-block, and may be guarded from being worn by the forward wheels in cramping the wagon.

The invention consists in constructing the reach-bars with short screw-threads upon their rear ends and long screw-threads upon their forward ends, so that they may be screwed into inclined screw-holes in the axle and head-block, and also in the combination, with the reach-bars, of collars and sleeves to receive the friction of the forward wheels in cramping the wagon, as will be hereinafter fully described.

A is the rear axle, and B is the head-block, of a wagon-gearing, which parts A B are made of metal.
The reach is formed of two iron bars, C, the forward ends of which are placed nearer together than their rear ends, as shown in Fig. 1. Upon the rear ends of the bars C are cut screw-threads D for a distance equal to the width of the rear axle, A. Upon the forward ends of the bars C are cut screw-threads E for a distance equal to the combined thickness of the rear axle, A, and the head-block B.

Through the rear axle, A, and the head-block B are formed screw-holes, which are inclined, as shown in Fig. 1, so as to be in line with the bars C.

In applying the reach, the bars C are screwed into the screw-holes in the head-block B for the whole length of the screw-threads E. The rear ends of the bars C are then screwed into the screw-holes of the rear axle for the length of the screw-threads D, which screws their forward ends out of the head-block B for a distance equal to the width of the rear axle, A, and leaves the ends of the rods C flush with the outer sides of the axle A and head-block B, as shown in Fig. 2.

With this construction the axle A and head-block B will be firmly and rigidly connected together.

Upon the bars A, at a little distance apart, are formed, or to them are attached, collars F, and upon the said bars A, between the collars F, are placed tubular washers or sleeves G. The collars F and sleeves G are arranged in such positions that the tire of the forward wheel, when the wagon is cramped, will strike against and rotate the sleeve G, and thus prevent the reach-bars from being worn.

In the drawings only one of the reach-bars A is represented as being provided with collars F and a sleeve, G; but in practice both reach-bars should be provided with collars and sleeves.

Having thus described my invention, what I claim as new, and desire to secure by Letters Patent, is—

1. In a wagon-gearing, the reach-bars C, constructed with long screw-threads E upon their forward ends and short screw-threads D upon their rear ends, substantially as herein shown and described, so that the reach-bars C may be screwed into the axle A and the head-block B, as set forth.

2. In a wagon-gearing, the combination of the reach-bars C, provided with short screw-threads D upon their rear ends and long screw-threads E upon their forward ends, and the axle A and head-block B, provided with inclined screw-holes, substantially as herein shown and described, so that the bars, axle, and head-block may be screwed together, as set forth.

3. In a wagon-gearing, the combination, with the reach-bars C, of the collars F and sleeves G, substantially as herein shown and described, to prevent the reach-bars from being worn by the forward wheels of the wagon in cramping, as set forth.

JAMES J. DUBOIS.

Witnesses:
FRANK DUBOIS,
JAMES GORDON.